United States Patent [11] 3,612,896

| [72] | Inventor | Arthur H. Firester<br>Kendall Park, N.J. |
| --- | --- | --- |
| [21] | Appl. No. | 37,645 |
| [22] | Filed | May 15, 1970 |
| [45] | Patented | Oct. 12, 1971 |
| [73] | Assignee | The United States of America as<br>represented by the Secretary of the Army |

[54] ACHROMATIC OPTICAL UPCONVERTER
8 Claims, 4 Drawing Figs.

| [52] | U.S. Cl. | 307/88.3, 250/83.3 HP, 330/4.5, 350/8, 350/204, 350/205 |
| --- | --- | --- |
| [51] | Int. Cl. | H03f 7/04 |
| [50] | Field of Search | 307/88.3; 250/83.3 HP |

[56] References Cited
OTHER REFERENCES

Warner, "Applied Physics Letters," 15 Nov. 1968, p. 360–361. 307-88.3

*Primary Examiner*—Roy Lake
*Assistant Examiner*—Darwin R. Hostetter
*Attorneys*—Harry M. Saragovitz, Edward J. Kelly, Herbert Berl and Jeremiah G. Murray ABSTRACT: An achromatic optical upconverter having a pump source, an object source, a nonlinear optical material, and a filter for passing the sum of the pump and object frequencies. A lens, which forms a real image of the object, directs the object rays toward the entrance face of the nonlinear material. A dichroic mirror or beam splitter mounted in the path of the object rays pass the object rays and reflect the pump rays toward the entrance face of the nonlinear material. The lens and the nonlinear material are spaced along the optical axis a distance such that chromatic abberations caused by the lens are eliminated by the nonlinear material which produces an equal and opposite effect and vice versa.

ACHROMATIC OPTICAL UPCONVERTER

The present invention relates to image converters and more particularly to optical upconverters.

In the fields of thermography, night surveillance, night communications, etc. it has been the general practice to employ devices such as image converters for the purpose of converting infrared images into visible images. The optical upconverter shifts the frequency of the object beam into the visible light region, by mixing the object beam and a pump beam in a nonlinear optical material.

Those concerned with the development of optical upconverters have long recognized the need for a means for reducing chromatic abberation without the necessity and expense of using achromatic components or the requirement of having to place the nonlinear material at the plane of the real image of the object being viewed. The present invention fulfills this need.

The general purpose of this invention is to provide a simple and inexpensive optical upconverter relatively free of longitudinal chromatic abberation in the output image. To attain this, the present invention contemplates a unique achromatic combination of a lens and the nonlinear optical material.

Other advantages of the invention will hereinafter become more fully apparent from the following description of the annexed drawings, which illustrate a preferred embodiment, and wherein.

Figure 1:
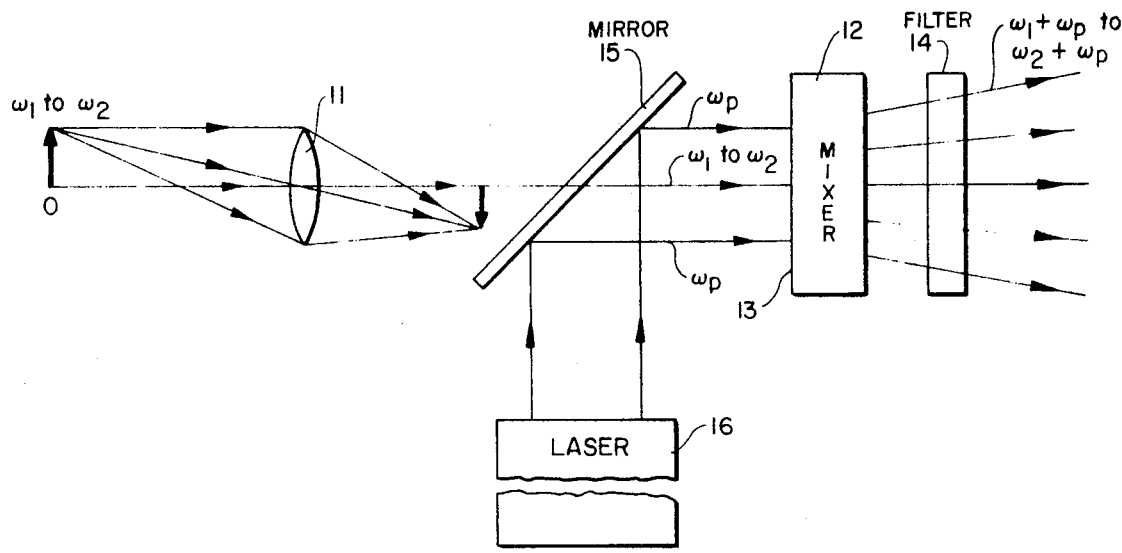
FIG. 1 shows a diagrammatic view of a preferred embodiment of the invention.

Referring now to the drawings, there is shown in FIG. 1 an optical upconverter having a simple lens 11, a nonlinear optical material 12 having an entrance face 13, and an output filter 14. A beam splitter or dichroic mirror 15 is mounted for reflecting the output beam $\omega_p$ of a pump source such as a laser 16 toward the entrance face 13 of material 12. Mirror 15 passes the beam radiated by a polychromatic object 0. Object 0 is represented by an arrow having frequency component $\omega_1$ and $\omega_2$ which represent the upper and lower frequency limits of the radiation band of interest.

Generally, the operation of the upconverter may be viewed in the following way. Radiation in the band $\omega_1$ to $\omega_2$ from the object 0 passes through the simple lens 11 and the mirror 15 and enters the nonlinear material 12 at the entrance face 13. At the same time, radiation of a frequency $\omega_p$ also enters the nonlinear material 12 via the entrance face 13 after being reflected by mirror 15. Radiation from the pump 16 and the object 0 interact in material 12 and produce the sum frequency which is passed by filter 14. The output of filter 14 may be viewed with the human eye or converted into a real image by an optical system (not shown).

Figure 2:
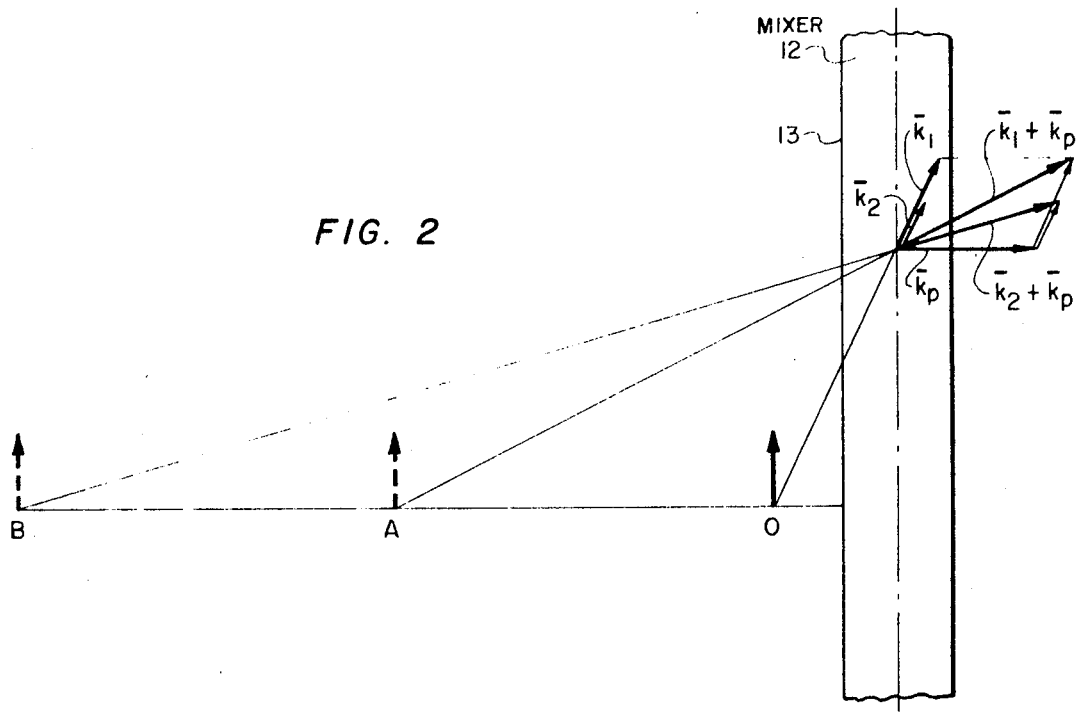
FIGS. 2 and 3 are diagrammatic views of portions of the device shown in FIG. 1.

The manner in which chromatic abberations are caused by material 12 may be seen with the aid of FIG. 2. As a result of the conservation of momentum the wavevectors $\bar{k}_1$ and $\bar{k}_2$ will add vectorially with wavevector $\bar{k}_p$ to determine the direction of propagation of the sum frequency in the manner shown in FIG. 2. The object 0 has frequency components in the band $\omega_1$ to $\omega_2$ which radiate toward the entrance face 13. One of these rays is represented in FIG. 2 by wavevectors $\bar{k}_1$ and $\bar{k}_2$. The length of these wavevectors will depend on the frequency or wavelength of the particular components. Because the lengths of the wavevectors $\bar{k}_1$ and $\bar{k}_2$ are different, the sums $\bar{k}_1+\bar{k}_p$ and $\bar{k}_2+\bar{k}_p$ are not colinear, thereby causing these components to appear to be coming from the two different locations A and B. If, however, the lens 11 is designed to cause chromatic abberations opposite to that of the nonlinear material 12 then an achromatic combination of the material 12 and the lens 11 can be constructed.

Figure 3:
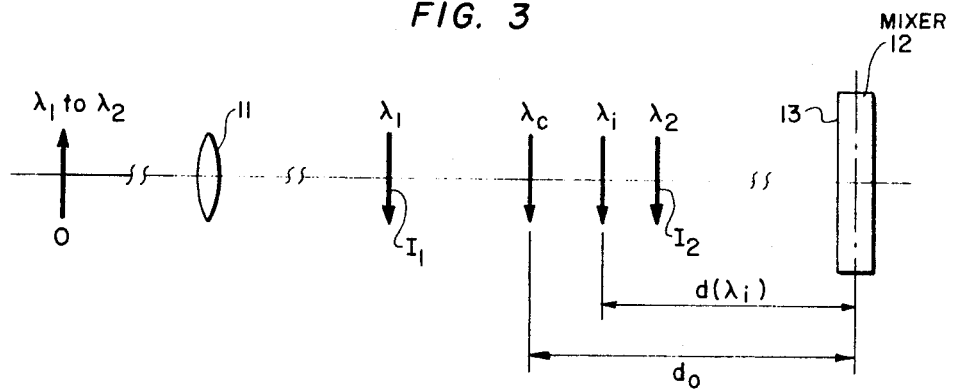

With reference to FIG. 3, the general procedure of providing an achromatic combination will now be described. The object 0 has two frequency components diagrammatically shown as an arrow having a band of wavelengths from $\lambda_1$ to $\lambda_2$. Assume that a series of real images between images $I_1$ and $I_2$ are produced due to the chromatic abberation of the lens 11. If $d(\lambda_i)$ is the distance from the center of the nonlinear material 12 to the $i^{th}$ real image having wavelength $\lambda_i$, then the apparent location of the upconverted image with respect to the center of the nonlinear material will be $z(\lambda_i)$ where $1/\lambda'_i = 1/\lambda_i + 1/\lambda_p$ and $\lambda'_i$ is the upconverted wavelength and $\lambda_p$ is the wavelength of the pump beam. Then to a first order approximation $z(\lambda'_i) = d(\lambda_i)(1+\lambda_i/\lambda_p)$. The nonlinear material 12 should be designed and located such that due to the chromatic abberations caused thereby, the apparent location of the real images $I_1$ to $I_2$ will merge at some distance from the center of the nonlinear material 12. This distance can be chosen to be equal to the apparent distance from the center of the nonlinear material 12 of the real image of the center frequency component $\omega_c$ of the object. Therefore, assume the center frequency image having a wavelength $\lambda_c$ is focused by lens 11 a distance $d_o$ from the center of the nonlinear material 12. Now, if we let $\lambda_i = \lambda_c + \Delta$ and we assume that the lens 11 spaces the various images linearly along the optical axis, then $$d(\lambda_i) = d(\lambda_c + \Delta) = d_o - \alpha\Delta$$

where $-\alpha$ is some constant which depends on the characteristics of the lens 11. Therefore, the apparent location of the $i^{th}$ image is $$z(\lambda'_i) = (d_o - \alpha\Delta)(1 + \lambda_{ci}\lambda_p + \Delta/\lambda_p) =$$
$$d_o(1+\lambda_{ci}\lambda_p) - \Delta[\alpha(1+\lambda_{ci}\lambda_p) - d_o/\lambda_p] - \alpha\Delta^2/\lambda_p$$

The second term on the right side of the above expression can be made to vanish by setting $$d_o = \alpha(\lambda_p + \lambda_c)$$

Therefore, if we assume that the last term $\alpha\Delta^2/\lambda_p$ is negligibly small, since it involves the square of the difference in wavelength, then the apparent distance $z(\lambda'_i)$ of the $i^{th}$ upconverted image will be independent of wavelength and will be given by $$z(\lambda'_i) = \frac{\alpha(\lambda_p + \lambda_c)^2}{\lambda_p}$$

This expression is a function only of $\alpha$, which is a characteristic of the lens 11, and of $\lambda_p$ and $\lambda_c$ which are the wavelengths of the pump 16 and the center frequency of the object 0, respectively. Therefore, the apparent location of the images $I_1$ and $I_2$ will merge and the chromatic abberation will be substantially eliminated, if the center of the nonlinear material is spaced a distance $d_o = \alpha(\lambda_p + \lambda_c)$ from the location of the real image formed by lens 11 of the center frequency component of the object 0.

A simple example which will demonstrate the procedure for calculating the proper distance $d_o$ will now be given using the following typical parameters:

$\lambda_p = 1.06$ microns $\lambda_c = 3.0$ microns $n_c =$ refractive index for a fused quartz lens and a wavelength of 3.0 microns = 1.4

$(dn/d\alpha)_{\lambda_0} =$ rate of charge of refractive index with respect to wavelength of fused quartz lens evaluated for $\lambda_c$ at 3.0 microns = $2.5 \times 10^{13}$ microns[11]. As shown earlier, the distance $d_o$ is a function of the pump and object wavelengths $\lambda_p$ and $\lambda_c$, and the constant $\alpha$, a parameter which characterizes the amount of chromatic abberation caused by the lens 11. The constant $\alpha$ may be defined as $$\alpha = \frac{d_0 - d(\lambda_i)}{\Delta}$$

For a distant object 0, this expression for $\alpha$ reduces to $$\alpha = (df/d\lambda)$$

where $df$ is the incremental change in focal length measured from $f_c$, the focal length of the image having wavelength $\lambda_c$, and $d\lambda$ is the corresponding incremental change in wavelength. Assuming lens 11 to be a thin spherical lens, then the focal length is $$f = \left(\frac{1}{r_1} - \frac{1}{r_2}\right)^{-1}\left(\frac{1}{n-1}\right)$$

where $r_1$ and $r_2$ are the surface radii of curvature. Therefore, $$\alpha = \frac{df}{d\lambda} = f_c \left(\frac{1}{n_c-1}\right)\left(\frac{dn}{d\lambda}\right)\lambda_c$$

For a fused quartz lens having a focal length $f_c$=100 mm. the distance $d_o$ is $$d_0 = \alpha(\lambda_p + \lambda_c) = f_c\left(\frac{1}{n_c-1}\right)\left(\frac{dn}{d\lambda}\right)\lambda_c\,(\lambda_p+\lambda_c)$$

$$= (100\text{mm.})\left(\frac{2.5\times 10^{-3}\mu^{-1}}{.4}\right)(3.0\mu + 1.06\mu) \approx 2.5\text{mm.}$$

Figure 4:
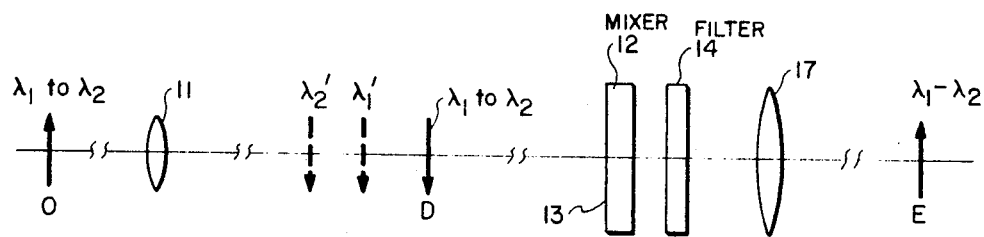
FIG. 4 is a diagrammatic view of a modification of the device shown in FIG. 1.

If the lens 11 is achromatic and forms a real image at D, as shown in FIG. 4, then apparent upconverted images having wavelengths $\lambda'_1$ and $\lambda'_2$ will be formed by the nonlinear material 12 for the reasons given in connection with FIG. 2. Correction of this chromatic abberation can be accomplished by a second lens 17 which is so designed that a second real image is formed at E. By following the design procedure just explained for the device of FIG. 1, it can be shown that the distance that the lens 17 should be spaced from the nonlinear material will depend solely on the center frequency $\omega_c$ of the object 0, the pump frequency $\omega_p$, and the characteristics of the lens 17.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. An image converter comprising an object source means for radiating energy over a first band of frequencies; focusing means having a frequency dependent focal length for forming images of said object source means spaced along an optical axis; said images being spaced from each other a distance substantially proportional to the difference in image wavelength; a pump source means for radiating pump energy at a pump frequency; a nonlinear mixing means mounted on said optical axis for mixing energy at said pump and object frequencies; means for directing said pump and object energy at said mixing means; and said mixing means being spaced from one of said images a distance proportional to the sum of the wavelength of said pump energy and the wavelength of said one of said images.

2. The device according to claim 1 and wherein said one of said images has a frequency substantially equal to the center frequency in said band.

3. The device according to claim 2 and wherein the constants of proportionality related to the spacing of said images and the spacing of said mixing means from said one of said images are equal.

4. The device according to claim 3 and wherein said pump source means includes a laser means and said pump energy is in the form of plane waves.

5. The device according to claim 4 and further including a filter means mounted at the output of said mixing means for passing energy at the sum of said pump and object frequencies.

6. An image converter comprising an object source means for radiating energy over a first band of frequencies; focusing means having a frequency dependent focal length for forming real images of said object source means along an optical axis; said images being spaced from each other a distance substantially proportional to the differences in image wavelength; a pump source means for radiating pump energy at a pump frequency; a nonlinear mixing means mounted on said optical axis for mixing energy at said pump and object frequencies and for forming a virtual image of said real images at the sum of said object and pump frequencies; said mixing means located on said optical axis a distance such that the apparent location of said virtual images is proportional to a function of only the pump wavelength and the wavelength of the center frequency of said object source.

7. The device according to claim 6 and wherein said pump source means includes a laser means and said pump energy is in the form of plane waves.

8. The device according to claim 7 and further including a filter means mounted at the output of said mixing means for passing energy at the sum of said pump and object frequencies.